(12) United States Patent
Markovitch et al.

(10) Patent No.: US 10,428,628 B2
(45) Date of Patent: Oct. 1, 2019

(54) SURFACE-DRIVEN PUMPING SYSTEM AND METHOD FOR RECOVERING A FLUID FROM A SUBSURFACE HYDROCARBON DEPOSIT

(71) Applicant: Dalmatian Hunter Holdings Ltd., Calgary (CA)

(72) Inventors: Peter Theodore Markovitch, Calgary (CA); Larry Cardinal, Calgary (CA)

(73) Assignee: Dalmation Hunter Holdings Ltd., Calgary, Alberta (CA)

( * ) Notice: Subject to any disclaimer, the term of this patent is extended or adjusted under 35 U.S.C. 154(b) by 204 days.

(21) Appl. No.: 15/600,162

(22) Filed: May 19, 2017

(65) Prior Publication Data
US 2018/0334891 A1 Nov. 22, 2018

(51) Int. Cl.
| | |
|---|---|
| *E21B 43/12* | (2006.01) |
| *F04D 13/08* | (2006.01) |
| *F04D 15/00* | (2006.01) |
| *F16H 1/46* | (2006.01) |
| *F04D 13/02* | (2006.01) |
| *F04D 13/10* | (2006.01) |
| *F04C 2/107* | (2006.01) |

(Continued)

(52) U.S. Cl.
CPC .......... *E21B 43/126* (2013.01); *F04C 2/1071* (2013.01); *F04C 13/008* (2013.01); *F04C 15/0061* (2013.01); *F04C 15/0069* (2013.01); *F04D 13/02* (2013.01); *F04D 13/024* (2013.01); *F04D 13/08* (2013.01); *F04D 13/10* (2013.01); *F04D 15/0066* (2013.01); *F16H 1/46* (2013.01)

(58) Field of Classification Search
CPC ........ E21B 43/126; F02K 49/02; F04B 47/02; F04D 13/02; F04D 13/024; F04D 13/08; F04D 13/10
USPC ........................................................ 417/904
See application file for complete search history.

(56) References Cited

U.S. PATENT DOCUMENTS

| | | |
|---|---|---|
| 5,573,063 A | 11/1996 | Morrow |
| 2003/0132003 A1 | 7/2003 | Arauz et al. |

(Continued)

OTHER PUBLICATIONS

Canadian Intellectual Property Office—Office Action dated Mar. 10, 2016 issued in relation to corresponding Canadian patent application No. 2,872,220.

*Primary Examiner* — David J Bagnell
*Assistant Examiner* — Dany E Akakpo
(74) *Attorney, Agent, or Firm* — D. Doak Horne

(57) ABSTRACT

A surface-driven fluid recovery system for recovery of hydrocarbons, having an uphole prime mover, typically an electric motor, and an uphole speed-reduction transmission to reduce speed of rotation supplied by the prime mover to a rod string to thereby reduce frictional and cyclic fatigue stresses imparted on the rod string. A downhole speed-increasing transmission is provided to increase rotational speed prior to supply of rotational energy to a downhole centrifugal or progressive cavity pump. A magnetic coupling is interposed between the prime mover and the speed reduction gearbox or between the speed reduction gearbox and the rod string, to provide damping of high transient rotational stresses between the prime mover and the rod string and/or provide a method for selectively coupling or partially coupling/decoupling the rod string to the prime mover.

25 Claims, 12 Drawing Sheets

(51) Int. Cl.
  *F04C 13/00*  (2006.01)
  *F04C 15/00*  (2006.01)

(56) References Cited

U.S. PATENT DOCUMENTS

| | | | |
|---|---|---|---|
| 2014/0334891 A1* | 11/2014 | Sandler | B23B 41/00 408/11 |
| 2017/0051732 A1* | 2/2017 | Hemandez | F04B 17/06 |
| 2019/0006932 A1* | 1/2019 | Lewerenz | H02K 49/10 |

* cited by examiner

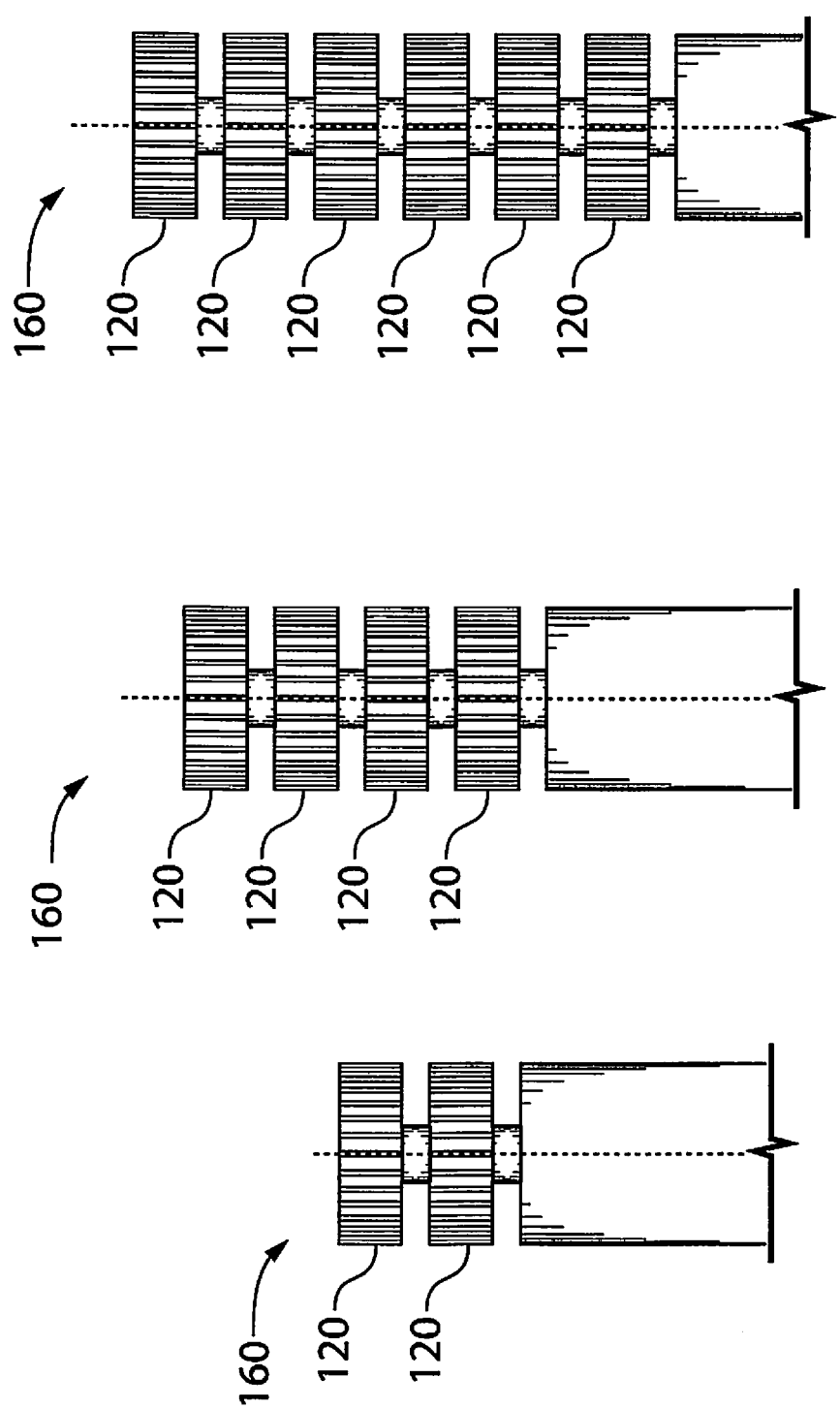

SURFACE-DRIVEN PUMPING SYSTEM AND METHOD FOR RECOVERING A FLUID FROM A SUBSURFACE HYDROCARBON DEPOSIT

FIELD OF THE INVENTION

The present invention relates to the field of subsurface fluid recovery and, in particular, to surface-driven pump systems for oil production from subsurface hydrocarbon deposits.

BACKGROUND OF THE INVENTION

Producing subsurface hydrocarbon deposits requires that a system be able to efficiently recover typically viscous and abrasive fluids from such deposits, typically 1,000 feet or greater below the surface, via a relatively small diameter casing (e.g., 2½" to 9.0" diameter). The challenges presented by such requirements has resulted in the development of a number of recovery systems. Of such systems, electric submersible pumping (ESP) has become one of the most widely applied systems for most field applications due to its high volume producing capability. The ESP system consists of a multi-stage downhole centrifugal pump directly driven by a downhole electric motor. Although proven to be effective, operating and servicing the system's downhole electric motor can be complicated and cost prohibitive. Moreover, use of an electrical pump downhole, such electrical pump and electrical wires leading thereto are potentially a source of electrical sparking. In a sometimes explosive environment of hydrocarbon and air as typically occurs downhole in a well, this can be accordingly extremely dangerous and thus highly undesirable, resulting in inability in some downhole applications to employ an ESP pump.

Addressing some of the shortcomings of the ESP systems are progressive cavity pumping (PCP) systems. A PCP system consists of a downhole progressive cavity pump actuated by a rod string that is rotated by a surface drive, typically an electric three phase motor, that can be easily operated and accessed for servicing, which progressive cavity pumps are further well suited for producing hydrocarbons from downhole explosive environments. Moreover, such downhole progressive cavity pumps, due to their "auger" design, are particularly suited to pump viscous, abrasive fluids found in "heavy oil" subsurface deposits. The performance of PCP systems, however, are known to be limited by speed and depth tolerance.

For efficient production, progressive cavity pumps typically require an operating speed of up to 1,200 rpm for best operation of the progressive cavity pump to maintain sufficient "head" to produce from depths at which viscous oil is typically found in North America, and in particular Alberta, in the Lloydminster, Alberta region.

Surface-driven rotation of the rod string does have vexing problems. Specifically, when a surface-driven PCP system is in operation, a significant quantity of energy is stored in the torsional strain of the rod string. The stored energy is released with backspin of the pump and/or rod string whenever the PCP system is shut down through routine operator intervention or automatic shut down, for example. When the power supply to the drive is lost or interrupted, the potential energy that remains in the system will cause the surface equipment and drive string to accelerate in the direction opposite its normal operating mode. Uncontrolled backspin can lead to surface equipment damage and backed-off rod strings or tubing. These conditions also pose a significant hazard to field personnel working on or near the surface equipment, and in some conditions, due to significant backspin of a PCP drive unit at surface, have caused surface drive units to overspeed and fail, and in at least one instance fly apart and cause death to at least one individual located in proximity to the surface drive unit for a particular well. Thus, it is essential that braking mechanisms are provided to control the release of rod-string torque and restrict rod recoil to a safe speed. In many applications, if unrestrained by a braking mechanism, backspin speeds can increase to the point at which the drive fragments and radially explodes outward because of the high centrifugal forces generated.

U.S. Pat. No. 5,573,063 discloses a surface-driven pumping apparatus that can efficiently recover fluids from a deep well. In particular, such patent teaches a geared centrifugal pumping system (GCP) consisting of an uphole electric motor which uses flexible belts and pulleys 36, 40 at surface to reduce the driven speed of the rod string, which rod string downhole is connected to a downhole speed increasing gearbox and associated downhole pump assembly. The combination of the belts and pulleys at surface to reduce the driven speed of the rod string several-fold, and the speed-increasing transmission located downhole to increase the rotational speed of the pump several-fold in relation to the rotational speed of the rod string allows the rotational speed of the rod string to thereby be lowered within the operation limits of the system while at the same time maintaining high rotational speed of the driven downhole pump to thereby achieve the desired necessary pressure, output, and efficiency from such downhole pump. In particular, the drive unit comprising the uphole speed reducing belts and pulleys reduces the motor RPM (typically up to 1,200 rpm) to a speed at which the rod string can be stably rotated (about 500 rpm) thus reducing wear on the rod string (both frictional and fatigue loading due to back and forth bending of such rod string during rotation thereof), and the downhole geared transmission coupled at one end to the rod string and at another end to the downhole pump, is used to increase the speed of the rod string typically to the 1200 rpm range to thereby reach the optimum rpm for best operation of the downhole pump to produce fluids from the well.

Advantageously, as noted in the specification of U.S. Pat. No. 5,573,063 (ref col. 6, lines 63-65 thereof), the belt and pulley speed-reduction system of U.S. Pat. No. 5,573,063 provides damping, via the belts, to avoid transitional high stresses being transmitted from the rod string to the pulleys and driving motor, and vice versa, which according to the teaching of such patent provides a clear advantage over direct gearing system being used as the uphole speed-reduction mechanism. Specifically, the above system of U.S. Pat. No. 5,573,063 using belts and pulleys to reduce speed at surface is particularly used to reduce high cyclic stresses between the rod string and the uphole motor and damp such high transitional stresses which would otherwise be directly transmitted via a gearbox to the rod string, and vice versa (ref. col. 6, lines 63-65).

Undesirably, however, the belt and pulley speed-reduction system of U.S. Pat. No. 5,573,063 poses a corresponding problem with regard to wear of the associated semi-elastic flexible belts due to imposed transitional tensional stresses imparted thereon during operation. Accordingly, the system of U.S. Pat. No. 5,573,063 is often prone to failure due to such stresses being imposed on the belts and pulleys, resulting in the need to frequently service such systems and frequently stop operation of such system to replace belts.

Accordingly, a need still exists for a pumping system that can achieve the advantages of reduced rotational speed of the rod string yet still achieve sufficient downhole rotational speed of the downhole pump while further damping and/or reducing transmission of transitory high stresses between the rod string and the uphole driving unit, yet further be sufficiently robust to and avoid the need to frequently service such uphole drive systems.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

Disclosed herein are exemplary embodiments pertaining to a surface-driven pumping system which are able to achieve the advantages of reduced rotational speed of the rod string yet still provide sufficient downhole rotational speed of a downhole pump, and further be able to damp and/or reduce transmission of transitory high stresses between the rod string and the uphole driving unit and vice versa while still providing a robust and durable configuration which need not be serviced to replace worn belts.

The surface-driven fluid recovery system according to the present invention comprises a surface drive system for generating rotational power that need not use belts and pulleys, and instead provides for a magnetic coupling that transmits the generated rotational power of the prime mover to a high capacity pump submersed in a subsurface hydrocarbon deposit which provides a damping feature. In particular, the system comprises, in one embodiment thereof, a magnetic drive coupling that comprises an outer magnetic assembly mounted to the surface drive system and an inner magnetic assembly mounted to the shaft assembly/rod string to magnetically couple the shaft assembly to the surface drive system. The outer magnetic assembly is coupled to the inner magnetic assembly by a magnetic field, thereby allowing indirect transmission of the rotational power to the pump through the shaft assembly without direct coupling. The magnetic coupling of the present invention, in various embodiments thereof as set out below, provides many advantages to be realized. Importantly, however, in all embodiments, thereof, the magnetic drive coupling of the present invention does not allow direct coupling of the prime mover to the rod string and only allows indirect coupling through a magnetic field linking two components together. In such manner high transient rotational forces applied to the shaft assembly (rod string) caused by intermittent and transient variations in pump speed (due to receiving from time to time various "slugs" of mixtures of gas and oil) can thereby be damped and/or reduced in severity thereby reducing imparted cyclic stresses exerted on the system, thereby extending the life of the equipment, in particular the rod string, thereby reducing the number of times the rod string need be withdrawn from a well for servicing or replacement, thereby reducing cost and reducing consequential lost operating time of the well.

Due to the indirect manner of coupling provided by the magnetic coupling of the present invention, the degree of magnetic coupling may be controllable and is limited. Typically, the degree of magnetic coupling is torque-limited due to limited strength of permanent magnets employed or where an electromagnet is provided to provide a magnetic field. This can be designed to be set to a desired maximum. Excess torque being supplied to such magnetic coupling may cause partial decoupling to occur. Where a magnetic field is created through use of an electromagnet, partial de-actuation of the magnetic field, as in the case of a magnetic field which is created by the supply of electrical power to an electrical winding surrounding a ferro-magnetic material, which may be instantly actuated and de-actuated, or partially de-actuated by a power control device, may be used to control the magnitude of electrical power provided to the electrical winding, and thus the extent of magnetic coupling or decoupling, as shown in FIGS. 9A and 9B.

In addition, the present design incorporating a magnetic coupling provides an important further solution to a problem to which this speed-reduction and speed increasing design would otherwise uniquely suffer from, namely the problem of over-torqueing the rod string and causing failure thereof.

Specifically, in the system of the present invention where a speed-reducing gearbox is employed uphole, due to the same rotational energy being needed to turn the downhole pump via the speed-increasing gearbox, the torque being needed to be transmitted to the shaft assembly (which in turn powers the speed-increasing gearbox) must necessarily be increased. However, when a pump seizure occurs, resulting for example from "sanding-in" of the pump during operation or in situations where from time to time various "slugs" of mixtures of gas and oil are temporarily encountered by the pump, due to the increased torque being supplied to the rod string via the speed-reducing transmission, very high torsional cyclic stresses can accordingly now be imparted on the rod string due to the rod string being unable to effectively release the energy being imparted thereto. Such a situation can easily thereby result in overstressing (over-torqueing) of the rod string and failure thereof. However, with the present system further employing a magnetic coupling, due to the indirect manner of magnetically coupling the prime mover to the rod string, relative rotational movement can be designed to be permitted during times of overly high rotational forces being imparted, and "slippage" of the coupling being then allowed. Alternatively, when an electromagnetic coupling system is employed and such high transient stresses are imparted on the coupling, current to the electromagnet may be temporarily reduced to thereby allow the magnetic coupling to partially decouple and effectively operate as a clutch so as to thereby avoid imparting a high transient cyclic stress on the drive equipment, including and in particular on the rod string. This is particularly useful when the pump may become sanded-in, and pump monitoring systems which monitor pump output and well production may not be able to sufficiently quickly register such reduced output and initiate stoppage of supply of power to the prime mover.

In certain additional embodiments of the present invention, the magnetic drive coupling comprises inner and outer magnetic assemblies that are electromagnetically coupled, wherein ceasing or reducing the electrical current supplied thereto deactivates the magnetic field and reduces or completely releases transmission of the rotational power to and from the rod string (shaft assembly).

The magnetic drive coupling of the surface-driven fluid recovery system of the present invention operates in combination with a speed-reduction transmission to reduce the rotational speed that is transmitted from the primary mover to the rod string. According to certain embodiments, the speed-reduction transmission is integrated in the surface drive system for controlling the rotational speed transmitted from the primary mover to the rod string (a.k.a. shaft assembly), and a downhole speed-increasing transmission is further used for increasing the rotational speed of the pump. According to particular embodiments, the uphole speed-reducing transmission and the downhole speed-increasing transmission may be identical, and simply reversed when employed in the system of the present invention. This advantageously allows for interchangeability of either transmission in the field, when only a single replacement transmission may be available, and thus allows for easier servicing of wells in remote locations by allowing changeout of either the uphole speed reducing transmission or the downholed speed increasing transmission where only one replacement transmission may otherwise be on hand.

According to particular embodiments, the uphole speed-reducing transmission and the downhole speed-increasing transmission may each comprise a planetary gear assembly configured to respectively reduce and increase the rotational speed. According to such embodiments, the rotational speed can be incrementally stepped down or stepped up by using a planetary gear assembly. In particular embodiments, for example, the speed-reducing and speed-increasing transmissions can each comprise multi-stage planetary gear arrangements that can be successively combined to allow each speed transmission to produce a larger or smaller cumulative gear ratio. In this way, multi-stage planetary gears according to embodiments described herein and arranged in series can offer variable configurations for achieving variable desired gear ratios. In particular, such planetary gears assemblies can be arranged in stacked multi-stage configurations that thereby achieve the desired gear ratio.

Definitions

Unless defined otherwise, all technical and scientific terms used herein have the same meaning as commonly understood by one of ordinary skill in the art to which this invention belongs.

As used herein, the term "about" refers to an approximately +/−10% variation from a given value. It is to be understood that such a variation is always included in any given value provided herein, whether or not it is specifically referred to.

Accordingly, in a first broad embodiment of the present invention, such invention comprises a surface-driven fluid recovery system for producing viscous fluids from a subsurface hydrocarbon deposit, comprising:

a downhole pump situated downhole in a wellbore, and actuable by rotation;

an elongate shaft assembly extending from surface downhole is said wellbore, having a first uphole end and a second downhole end;

a speed-increasing transmission, interconnecting said second downhole end of the shaft assembly and said downhole pump, to increase rotational speed of said downhole pump;

a surface drive system, situated as said surface, for providing rotational energy to said first uphole end of said elongate shaft assembly, comprising:
 (A) a primary mover for generating rotational power;
 (B) a speed reduction transmission for reducing rotational speed supplied by said primary mover directly or indirectly to said first end of said shaft; and
 (C) a magnetic drive coupling, having an outer magnetic assembly and an inner magnetic assembly, each of which is magnetized or magnetizable;
 wherein:
 (i) said magnetic drive coupling is situated intermediate said primary mover and said speed reduction transmission, as shown in FIG. 8, and:
   (a) said outer magnetic assembly is coupled to an input end of the speed reduction transmission and said inner magnetic assembly is coupled to said primary mover; or
   (b) said outer magnetic assembly is coupled to said primary mover and said inner magnetic assembly is coupled to said input end of the speed reduction transmission;
 or
 (ii) said magnetic drive coupling is situated intermediate said speed reduction transmission and said first uphole end of said shaft assembly, and:
   (a) the outer magnetic assembly is coupled to an output end of the speed reduction transmission and said inner magnetic assembly is coupled to said first uphole end of said shaft assembly;
 or
   (b) said outer magnetic assembly is coupled to said first uphole end of said shaft assembly and said inner magnetic assembly is coupled to said output end of the speed-reduction transmission.

In a preferred embodiment, either the outer magnetic assembly or the inner magnetic assembly comprises an electromagnet and said electromagnet may de-actuated or partially de-actuated when desired, and wherein said de-actuation or partial de-actuation thereof causes the inner and outer magnetic assemblies to cease or reduce transmission of rotational energy between the surface drive system and the shaft assembly, particularly, but not limited to, instances when excessive rotational stresses being applied to said shaft assembly.

Specifically, in one refinement the outer magnetic assembly comprises an electromagnet and said inner magnetic assembly comprises a material capable of being magnetized by said electromagnet when an electrical current is supplied to said electromagnet, wherein when said electrical current is supplied to said electromagnet said outer magnetic assembly reduces or prevents relative rotational movement between said outer magnetic assembly relative to said inner magnetic assembly.

Alternatively, in another refinement the inner magnetic assembly comprises an electromagnet, and said outer magnetic assembly comprises a material capable of being magnetized by said electromagnet when an electrical current is supplied to said electromagnet, wherein when said electrical current is supplied to said electromagnet said inner magnetic assembly reduces or prevents relative rotational movement between said inner magnetic assembly relative to said outer magnetic assembly.

Power control means may further be incorporated in the above system, to variably regulate the amount of electrical current supplied to said electromagnet, as shown in FIGS. 9A and 9B.

In top drive systems, "back spin" of the shaft assembly potentially results due to the "rubber band" effect of energy storage in the shaft assembly, which occurs when a torque is applied at one end of a long shaft to rotate a downhole pump situated at its other end. Back spin can be dangerous and cause damage to equipment, if for example sudden loss of power was to result and the prime mover, typically an electric motor, be free to rotate in an opposite direction to the normal driving direction, or in an instance where the downhole pump becomes "sanded-in" and thus lodged, and the rod string as a result becomes overtorqued and fails, resulting in immediate release of rotational energy and typically overspeed of transmissions/gearboxes and possibly "whippstocking" of the rod string at such time due to "over design" rotational speeds thereof being experienced.

Accordingly, in a further refinement of the present invention, such invention provides for a means of reducing the danger of overspeed during backspin, to reduce the overspeed and possible resulting damage to the recovery equipment. Thus in a further embodiment, wherein one of said outer magnetic assembly or said inner magnetic assembly comprises an electromagnet, the fluid recovery system of the present invention further comprises a selectively-actuable direct coupling means between said outer magnetic assembly and said inner magnetic assembly.

Such selectively-actuable direct coupling may comprise a spring-biased electrically-actuated solenoid, which in the normal operating condition a solenoid compresses a moveable pin member against a spring, to disengage from direct coupling the outer magnetic assembly from the inner magnetic assembly. Upon, for example, failure of electric current to be provided to the solenoid, the spring forces the pin member to extend so as to directly couple the outer magnetic assembly to the inner magnetic assembly. Many other ways, means, and configurations for providing a selectively-actuable direct coupling between the outer magnetic coupling and the inner magnetic coupling will now occur to those of skill in the art, and the invention is not to be limited to the single embodiment disclosed herein.

In such embodiment, in the event of failure of supply of electrical current to said electromagnet and said primary mover, the selectively-actuable direct coupling, namely in one embodiment the spring-biased pin which becomes released by the de-actuated solenoid and via the spring is biased into and provides direct coupling so as to directly couple the outer magnetic assembly to said inner magnetic assembly.

This aforesaid selectively-actuable direct coupling feature is particularly useful where the primary mover is an electric motor, and in the event of cessation of electrical power being provided to such electrical motor the electrical windings of such motor are electrically connected ("shunted") thereby allowing the motor to serve as a brake. In such a surface-drive system, further having the selectively-actuable direct coupling feature, the solenoid (which in such embodiment is now no longer being provided with electrical power) then causes the outer magnetic assembly to be directly mechanically coupled to inner magnetic assembly, to thereby directly connect the electrical driving motor to the rod shaft and thereby, through the braking provided by the motor, prevent the uncontrolled back-spin and possible damage through overspeed of the shaft assembly.

In one embodiment of the surface drive system of the present invention, the magnetic drive coupling is situated intermediate said speed reduction transmission and said first end of said shaft assembly (rod string), and:

(i) the outer magnetic assembly thereof is coupled to said first end of the speed reduction transmission and said inner magnetic assembly thereof is coupled to said first end of said shaft assembly; or (ii) said outer magnetic assembly thereof is coupled to said first end of said shaft assembly and said inner magnetic assembly is coupled to said first end of the speed reduction transmission In the event of loss of electric current to the electric motor (prime mover) (where no electrical shunting is employed on the electric motor to act as a brake), such embodiment has the advantage of avoiding "back spin" of the rod string and possible overspeed of the speed-reducing transmission, due to the rod string in such circumstances being disconnected from being coupled to the speed reducing transmission due to loss of coupling by the (electromagnetic) coupling device. In absence of such feature, possible overspeed of the speed-reducing transmission due to back-spin might have resulted causing possible failure thereof.

In an alternate embodiment the magnetic drive coupling is situated intermediate said primary mover and said speed-reducing transmission, as shown in FIG. 8, and:

(a) said outer magnetic assembly is coupled to said input end of the speed-reducing transmission and said inner magnetic assembly is coupled to said primary mover; or (b) said outer magnetic assembly is coupled to said primary mover and said inner magnetic assembly is coupled to said input end of the speed reduction transmission;

Such alternate embodiment has the advantage that in the event of failure of the magnetic coupling, any backspin of the shaft at the upper end thereof will necessarily be directed through the uphole speed-reduction transmission, the inertia of which will thereby resulting in a more gradual dissipation of the back-spin energy built up in the rod string than would be the case if the magnetic drive was directly coupled to the rod string without the uphole speed reduction transmission being situated therebetween and such magnetic drive was to fail.

BRIEF DESCRIPTION OF THE DRAWINGS

These and other features of the invention will become more apparent in the following detailed description in which reference is made to the appended drawings, depicting exemplary embodiments of the invention, in which:

FIGS. 6A, 6B, and 6C are schematic views of exemplary multi-stage configurations of the planetary gear assemblies, according to embodiments of the present invention.

DETAILED DESCRIPTION OF THE INVENTION

Embodiments of the present disclosure will now be described by reference to FIGS. 1 to 6, which show exemplary embodiments of the surface-driven fluid recovery system according to the present invention.

Figure 1A:
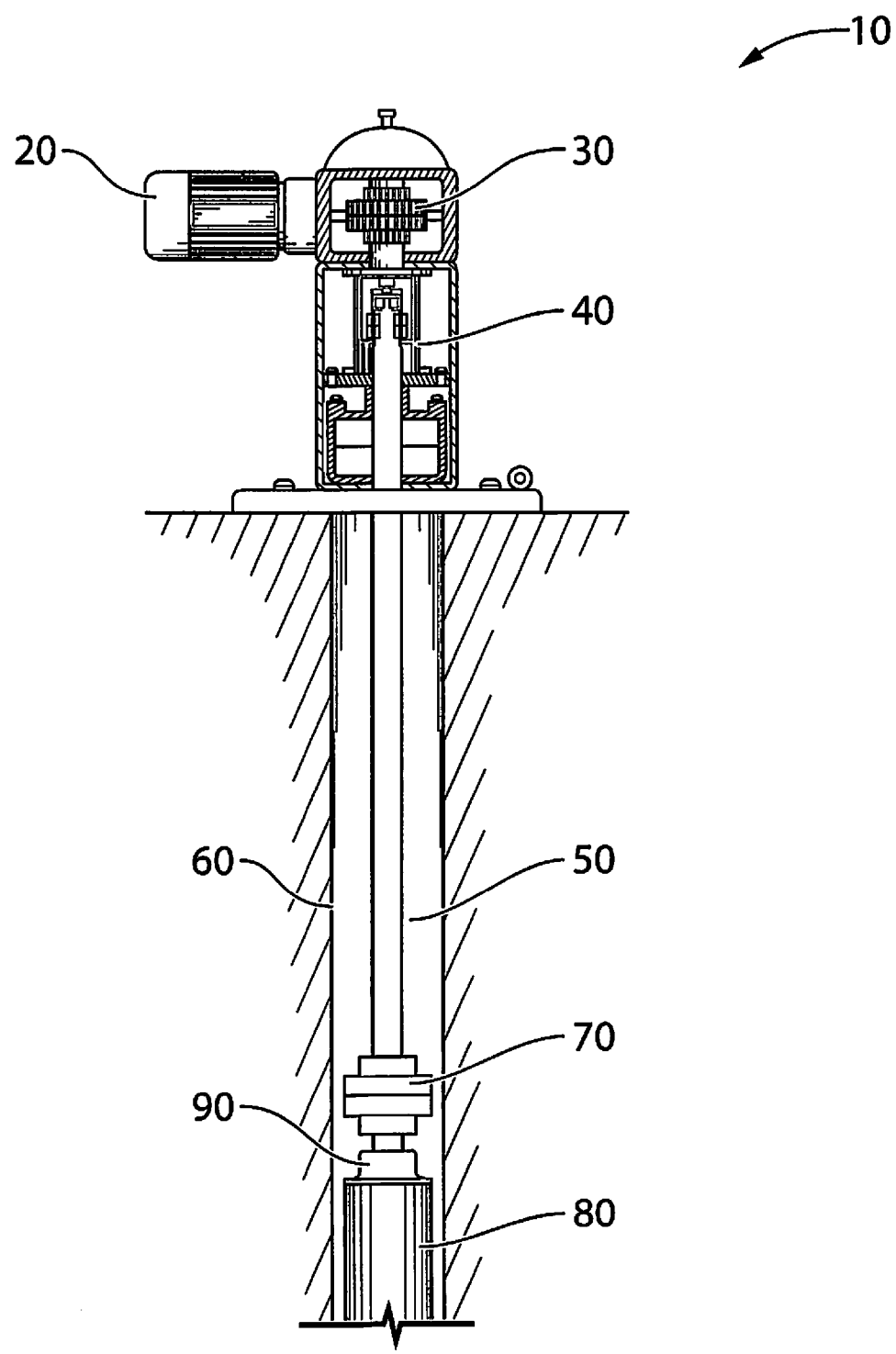
FIGS. 1A and 1B are side elevational views of a surface-driven fluid recovery system having a single motor, according to one embodiment of the present invention.
Figure 1B:
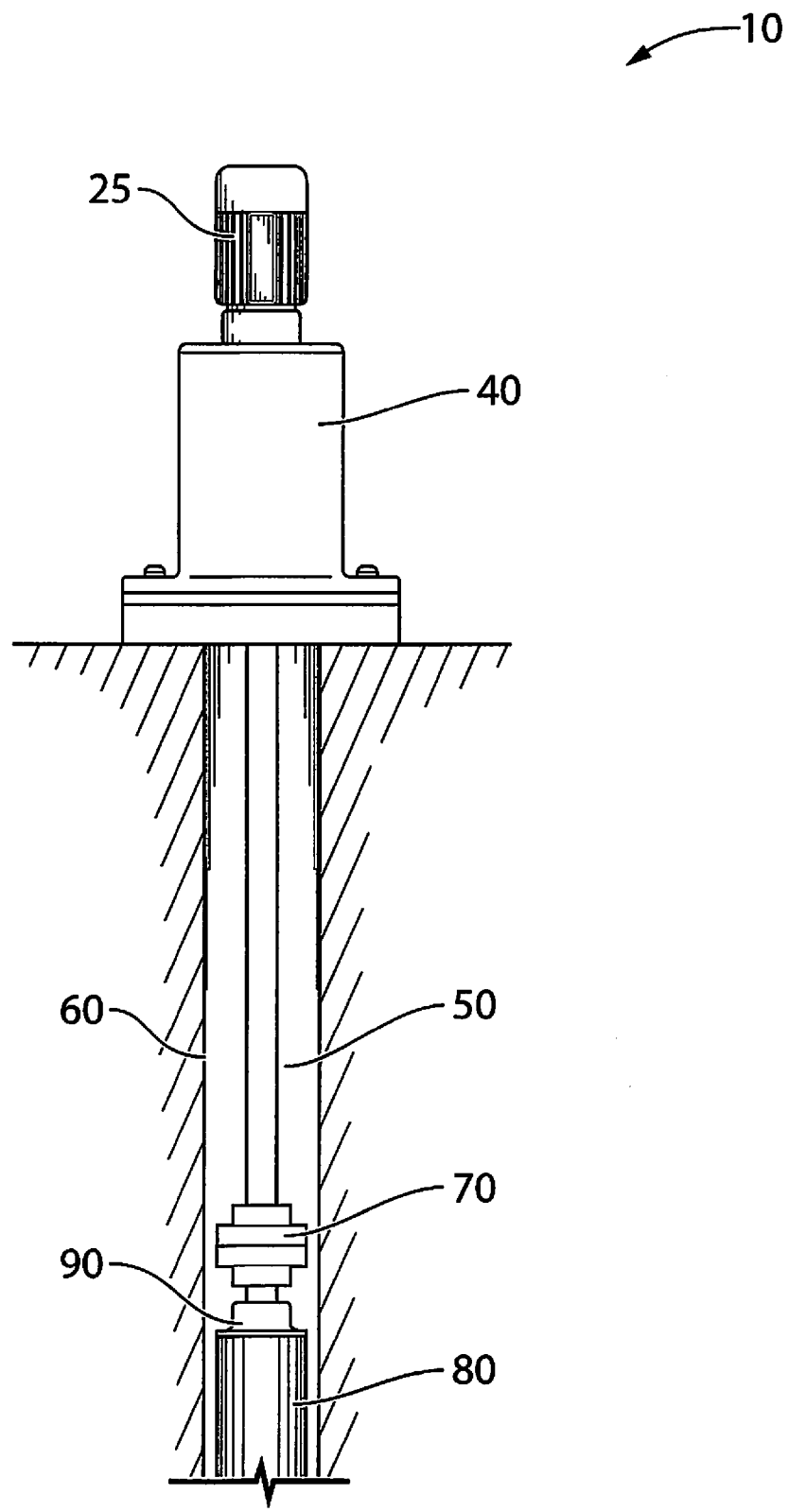
Figure 2A:
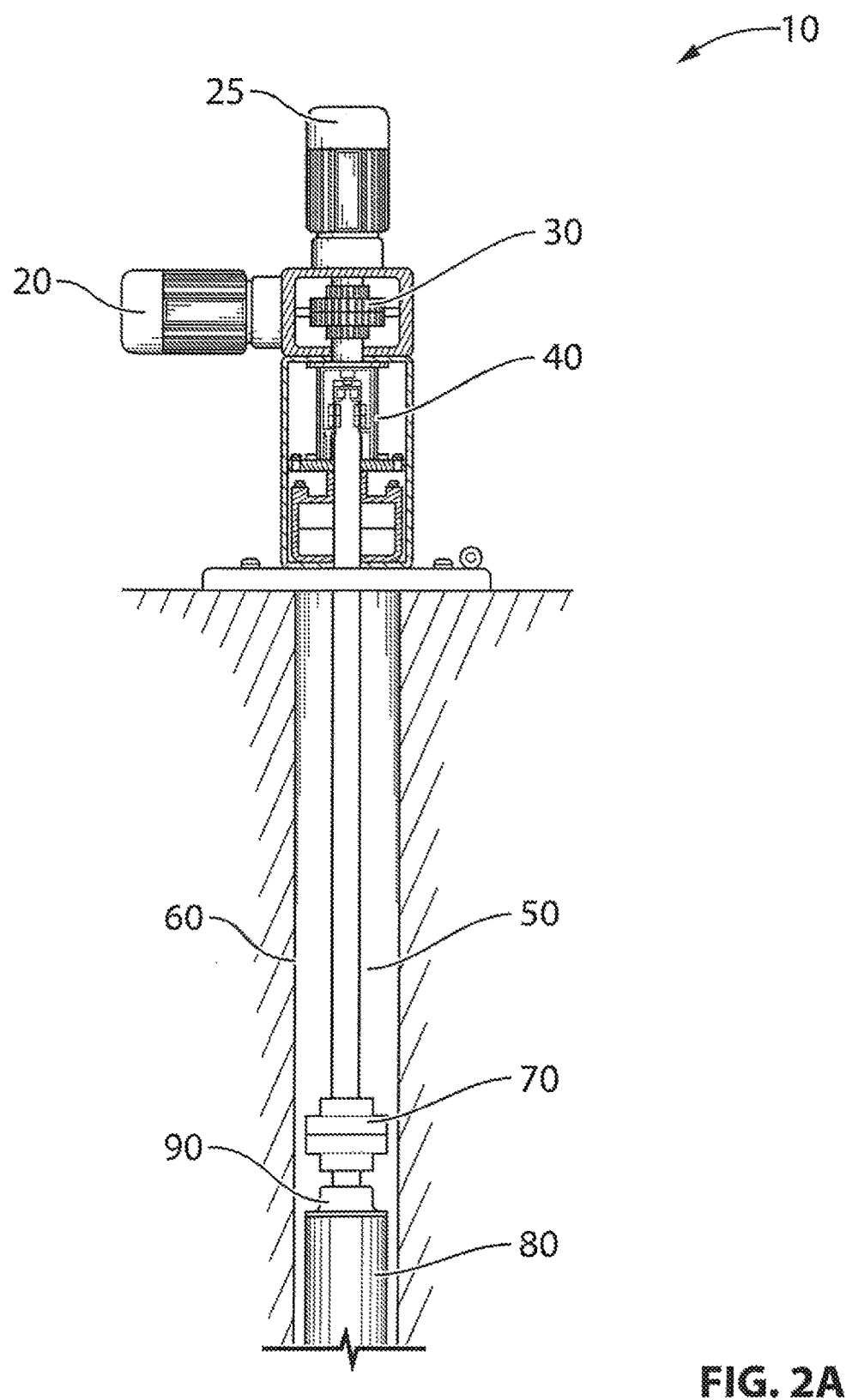
FIGS. 2A and 2B are side elevational views of a surface-driven fluid recovery system having two motors, according to another embodiment of the present invention.
Figure 2B:
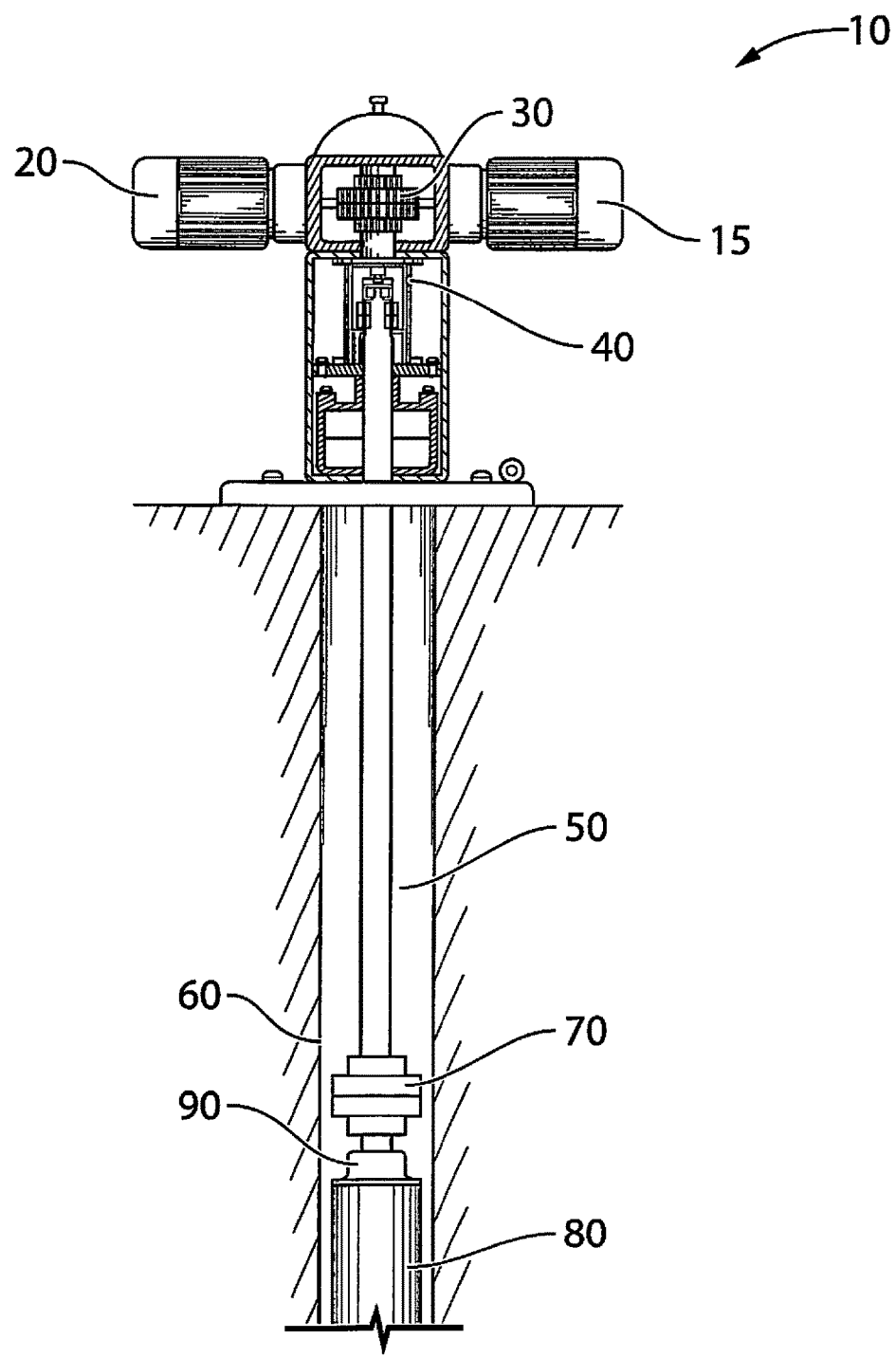
Figure 3:
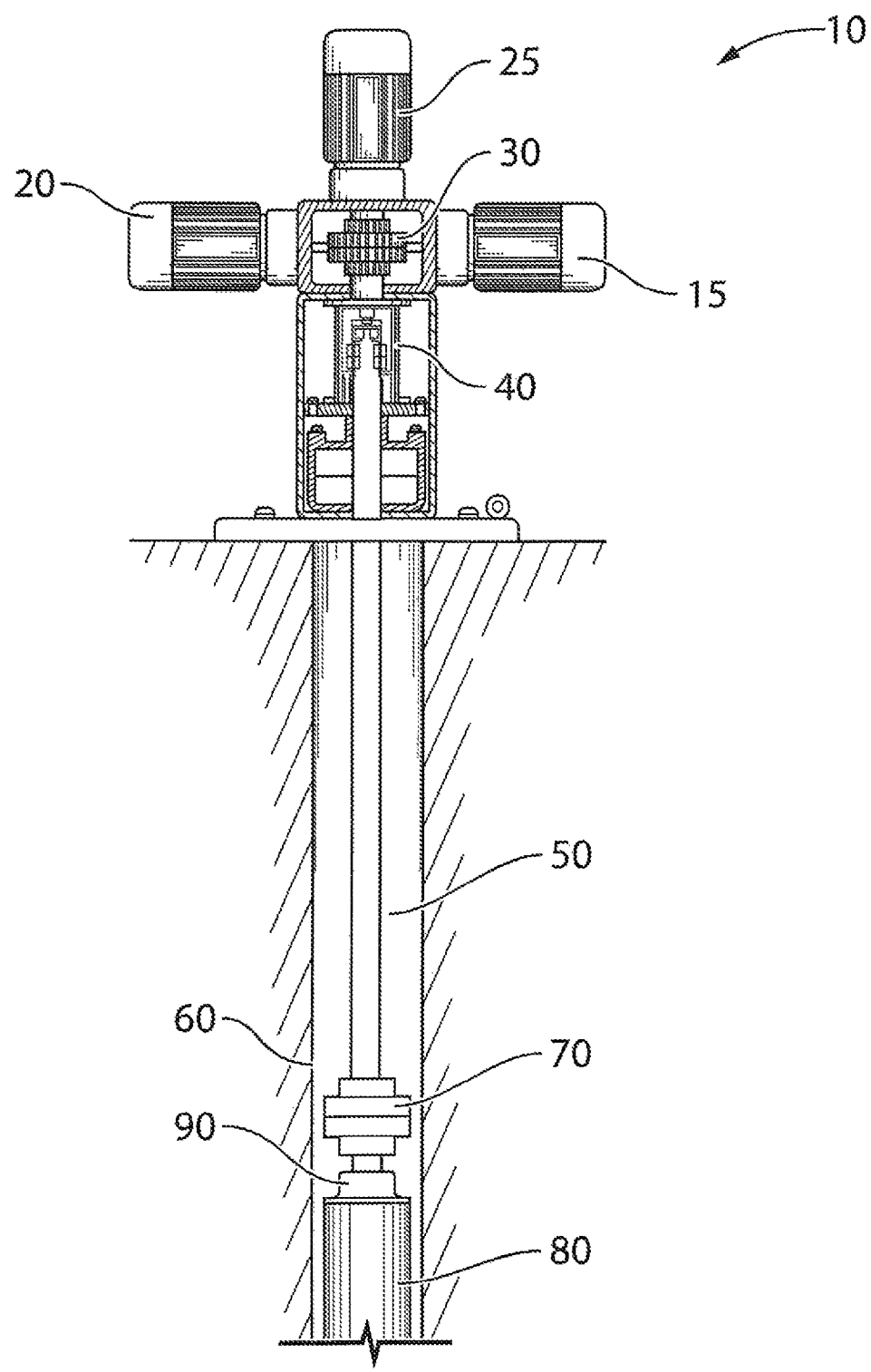
FIG. 3 is a side elevational view of a surface-driven fluid recovery system having three motors, according to another embodiment of the present invention.

Referring now to FIGS. 1 to 3, a surface-driven fluid recovery system 10 for producing viscous fluids from a subsurface hydrocarbon deposit is illustrated in various embodiments. The surface-driven fluid recovery system 10 of the present disclosure includes a surface drive system comprising a primary mover 15, 20, 25 for generating sufficient rotational power to rotate the shaft assembly 50. Primary movers typically used with surface-driven systems are well known in the art and include without limitation, for example, electric motors and internal combustion engines as well as hydraulically powered motors. The surface-driven fluid recovery system 10 of the present disclosure can include a variety of prime mover 15, 20, 25 arrangements in order to achieve sufficient generation of rotational power. According to embodiments, the primary mover can include at least one motor (FIGS. 1A and 1B). According to other embodiments, the primary mover can include two motors (FIGS. 2A and 2B) in various arrangements. According to further embodiments, the primary mover can include three motors (FIG. 3) in various arrangements.

The rotational power generated by the primary mover 15, 20, 25 is transmitted through a shaft assembly 50 to a high capacity pump 80, typically a progressive cavity pump comprising an inner helical rotatable rotor (not shown) rotatably inserted in a stationary outer stator (not shown), which pump 80 is submersed in a subsurface hydrocarbon deposit. The shaft assembly/rod string 50 is typically comprised of a series of sections of solid rod or pipe that are connected together, typically threadably, to make up the needed length to reach the particular depth of the deposit. The shaft assembly 50 alternatively may comprise continuous hollow tubing. The shaft assembly 50 is typically encased in a tubular well casing 60 of relatively small diameter. For example, it is not uncommon for a well casing to have an interior diameter of from about 2½" to about 9". As a result, the shaft assembly 50 is vulnerable to wear and torsional fracture at rotational speeds of greater than about 1,000 rpm. It is necessary, therefore, to be able to control the rotational speed generated by the primary mover 15, 20, 25, which typically generates rotational power at speeds greater than 500 rpm, for example about 1,200 rpm.

According to embodiments, the surface-driven fluid recovery system 10 of the present disclosure includes a rotational power transmission system that comprises an uphole speed-reducing transmission or gearbox 30, which in the embodiment shown is integrated in the surface drive system 10 for reducing the rotational speed of shaft assembly 50 as powered by the primary mover 15, 20, 25. The speed-reducing transmission 30 is configured to effect a reduction in the speed of the rotational speed generated by the primary mover 15, 20, 25 to ensure that the rotational speed transmitted to the shaft assembly 50 remains within the rotational speed limits of the shaft assembly 50. By having a lower rotational speed the number of cycles of alternating stresses, particularly where the rod string may not be perfectly straight and a whipping action results, is thereby reduced resulting in longer life of the rod string/shaft assembly 50. According to embodiments, the speed-reducing transmission 30 is configured to reduce the rotational speed to less than 1,000 rpm. According to other embodiments, the speed-reducing transmission 30 is configured to reduce the rotational speed to about 500 rpm or less.

In order to operate the pump 80 submersed in the subsurface deposit, however, the rotational power transmitted from the shaft assembly 50 must be increased to operating speeds of up to about 1,200 rpm. To achieve this, the rotational power transmission system of the surface-driven fluid recovery system 10 further comprises a speed-increasing transmission 70 which interconnects the downhole end of the shaft assembly 50 to the pump 80. According to embodiments, the speed-increasing transmission 70 is disposed in close proximity, or even connected to, the pump 80 in order to minimize impact of the increased rotational speed on the shaft assembly 50. According to embodiments, the -increasing transmission 70 is configured to increase the rotational speed up to about 1,200 rpm.

Figure 4:
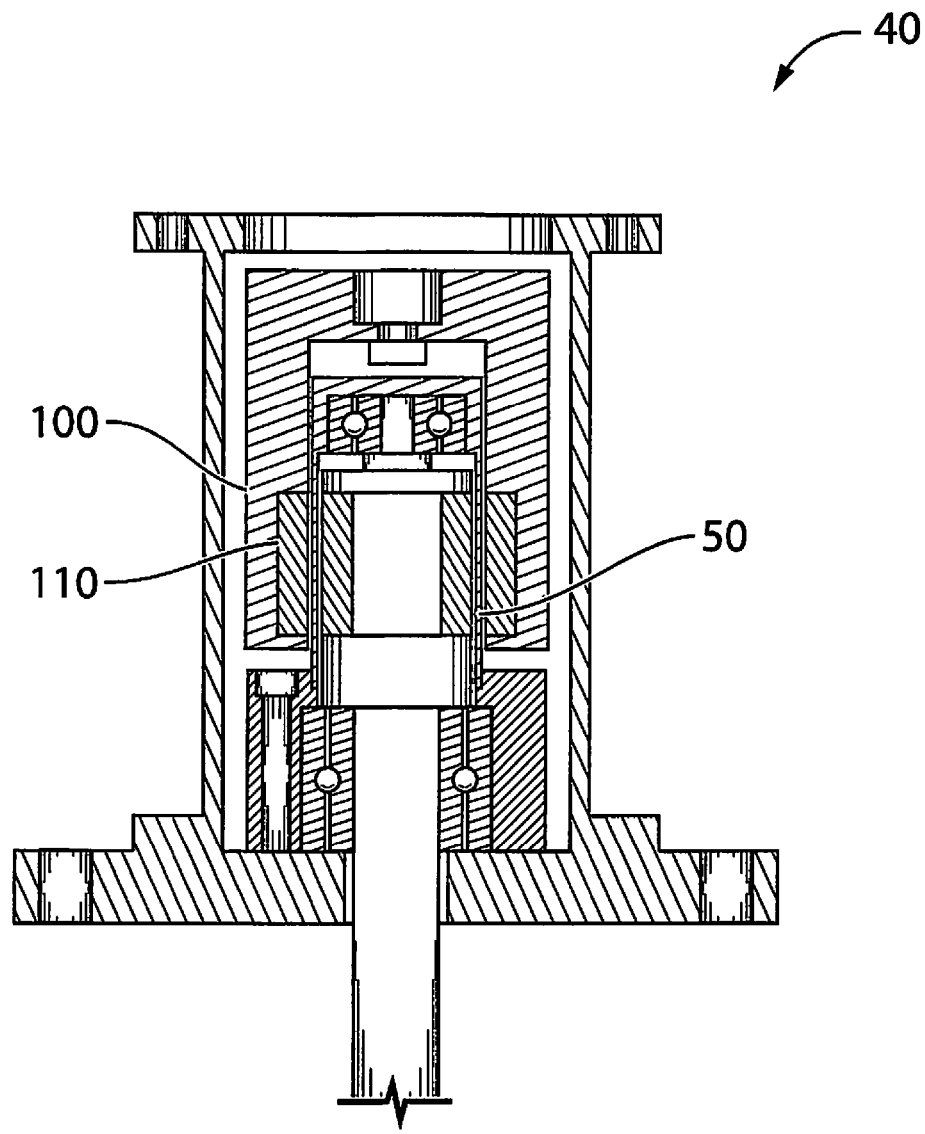
FIG. 4 is a side elevational view of an exemplary magnetic coupling drive of the surface-driven fluid recovery system shown in FIGS. 1 to 3, according to the present invention.

In addition to controlling the rotational speed of the shaft assembly 50, a certain level of vibration dampening is further achieved by a magnetic drive coupling 40 interconnecting the shaft assembly 50 to the surface-drive assembly. Referring to FIG. 4, the magnetic drive coupling 40 comprises an outer magnetic assembly 100 mounted to the surface drive system which provides a driving force, and a driven inner magnetic assembly 110 mounted to the shaft assembly 50. The inner 110 and outer 100 magnetic assemblies magnetically couple to connect the shaft assembly 50 to the surface drive system without physical contact, thereby, effecting a dampening effect. The outer magnet assembly 100 further moves the inner magnet assembly 110 by a rotating magnetic field which in turn ultimately allows transmission of the rotational power to the pump.

In one exemplary embodiment of the invention, the surface-driven fluid recovery system 10 comprises a high capacity pump 80. Typical of hydrocarbon production, high capacity pumps 80 can include multi-stage pumps, centrifugal pumps, and progressive cavity pumps (PCP). According to certain embodiments, the surface-driven fluid recovery system 10 comprises a progressive cavity pump (PCP).

Magnetic Drive Coupling

The inner magnetic assembly 110 and the outer magnetic assembly 100 may each possess permanent magnets, so as to permit, when coupled together, a coupling force which prevents relative motion of inner magnetic assembly 110 relative to the outer magnetic assembly 100, at least up to a pre-determined maximum rotational force being applied thereto. Where excess of such maximum rotational coupling force being provided thereto, relative "slippage" will advantageously occur between such two components 110, 100.

Alternatively, an electromagnet or electromagnets may be employed in one or both of said inner 110 and outer magnetic assembly 100 to achieve the required rotational coupling force between such two components. Thus in one embodiment thereof, outer magnetic assembly 100 may comprise an electromagnet, in the form of a ferromagnetic material surrounded by electrical windings (not shown), and inner magnetic assembly 110 merely comprise a ferromagnetic material.

In an alternative embodiment thereof, outer magnetic assembly 100 may comprise a ferromagnetic material, and inner magnetic assembly 110 may comprise an electromagnet, in the form of a ferromagnetic material surrounded by electrical windings (not shown).

In a further embodiment, both outer magnetic assembly 100 and inner magnetic assembly 110 may both comprise an electromagnet, in the form of a ferromagnetic material surrounded by electrical windings (not shown).

Figures 7A, 7B:
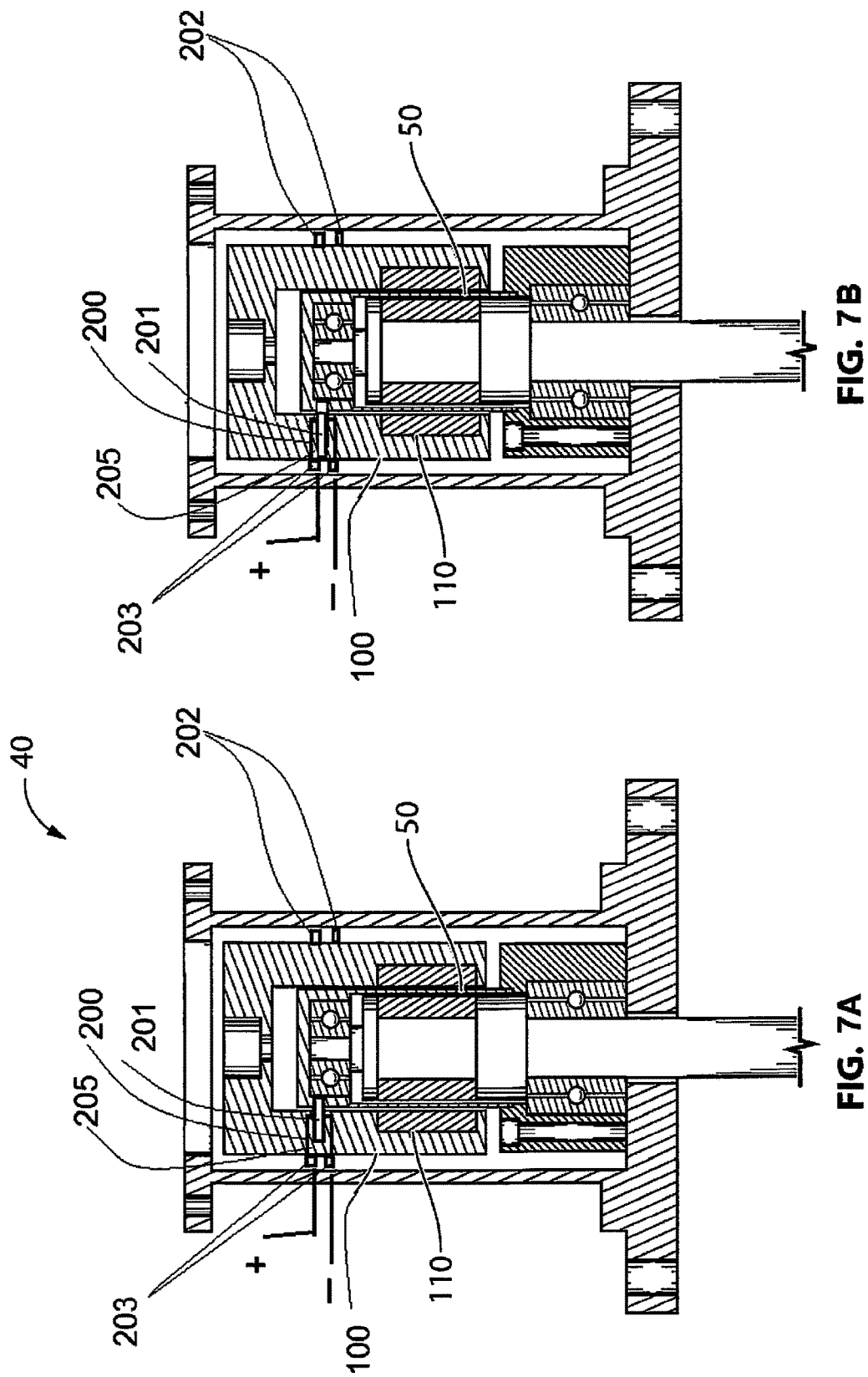
FIGS. 7A, 7B show a modified magnetic coupling, further having a selectively-actuable direct coupling in the form of a solenoid and pin assembly, for selectively directly coupling the outer magnetic assembly with the inner magnetic assembly, with FIG. 7A showing the outer magnetic assembly directly coupled to the inner magnetic assembly, with FIG. 7B showing the solenoid having caused the outer magnetic assembly to no longer be directly coupled to the inner magnetic assembly.
Figure 8:
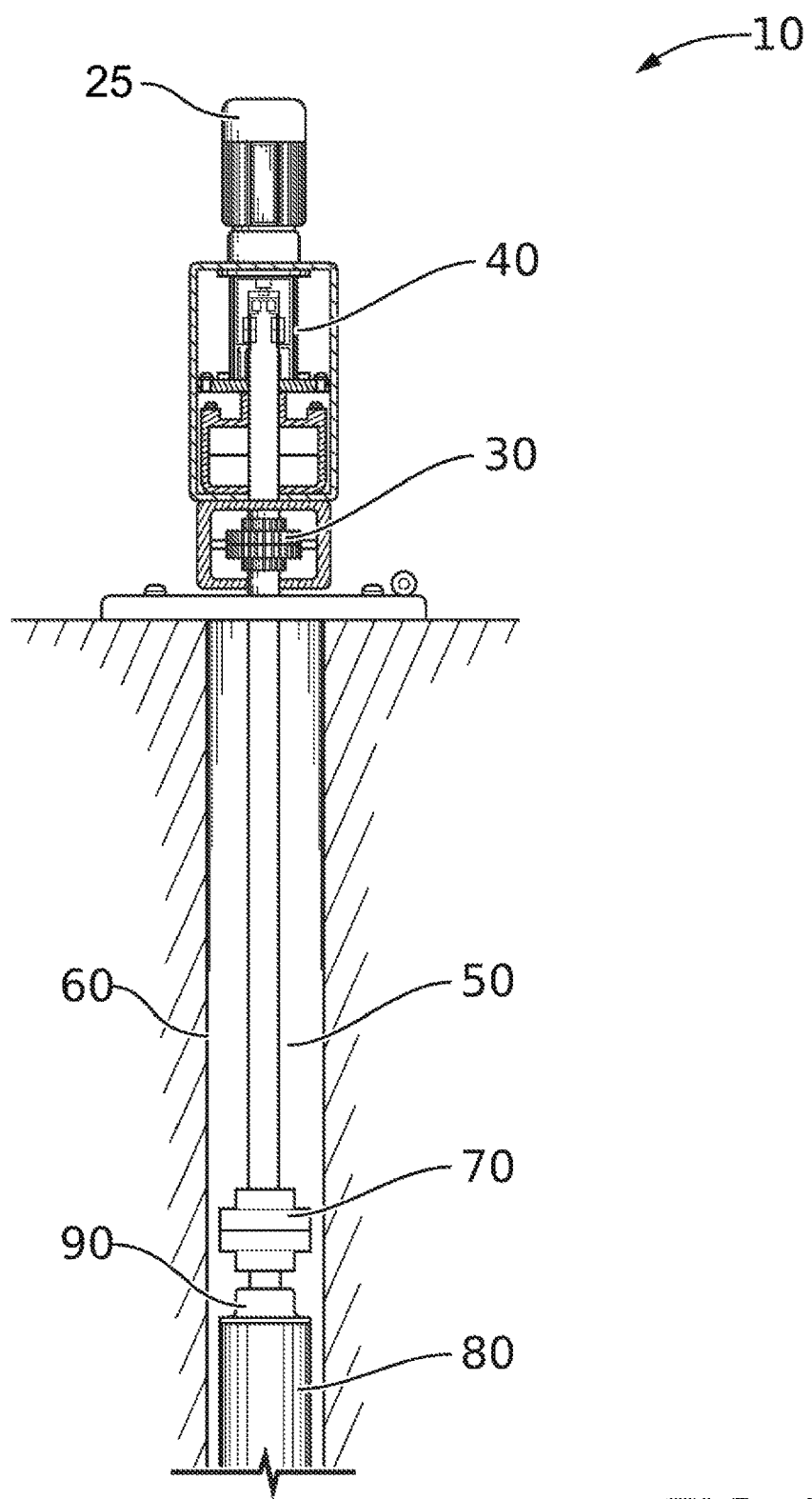
FIG. 8 is a side elevational view of a surface-driven fluid recovery system having a primary mover and an uphole speed-reducing transmission on the surface, and a magnetic drive coupling situated intermediate said primary mover and said speed-reducing transmission, according to another embodiment of the present invention.
Figure 9A:
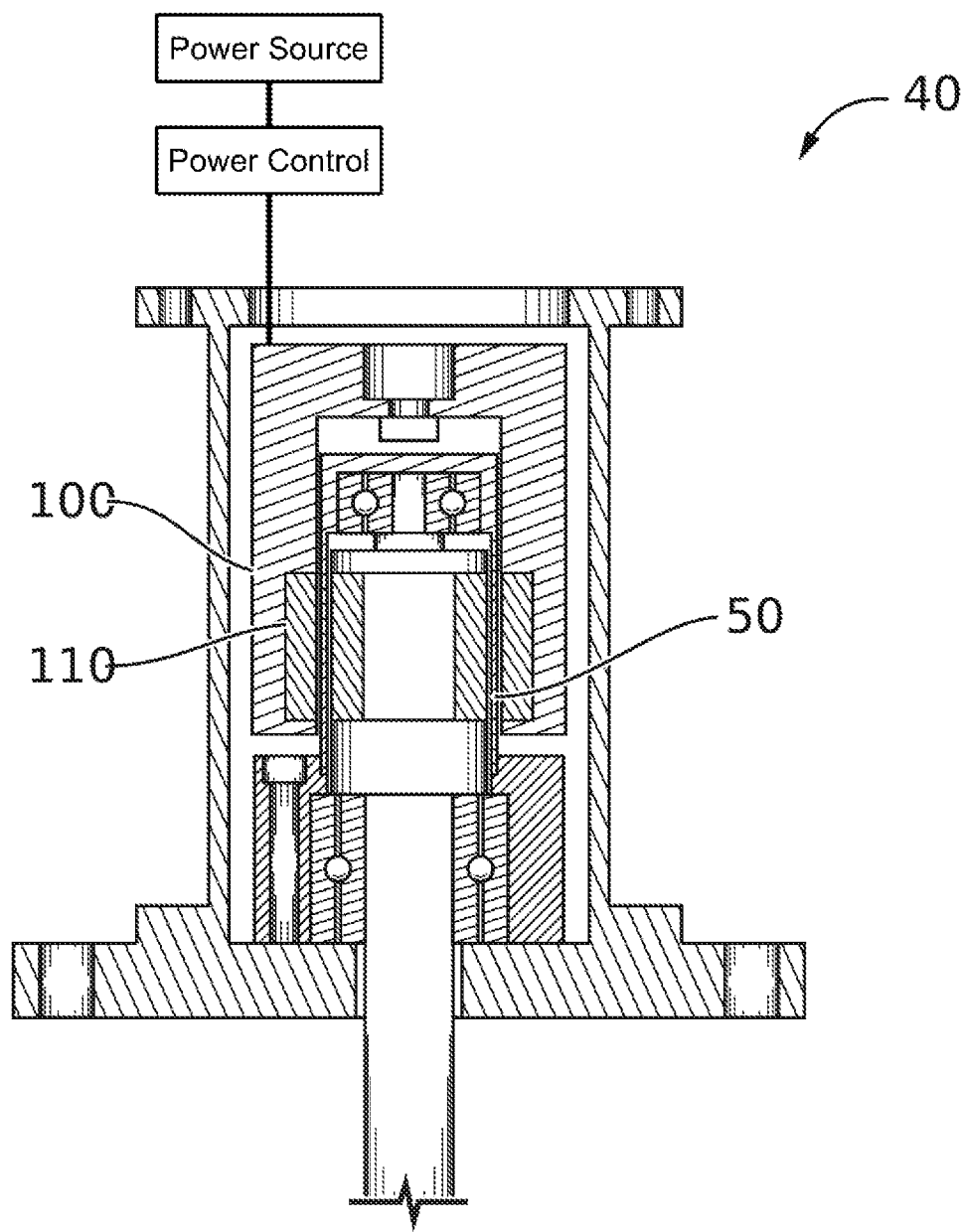
FIG. 9A is a partially schematic and partially side elevational view of an exemplary magnetic coupling drive of the surface-driven fluid recovery system shown in FIGS. 1 to 3, according to the present invention, wherein the magnetic coupling drive comprises an outer magnetic assembly and an inner magnetic assembly, the outer magnetic assembly comprises an electromagnet powered by a power source via a power control for variably regulate the amount of electrical current supplied to said electromagnet.
Figure 9B:
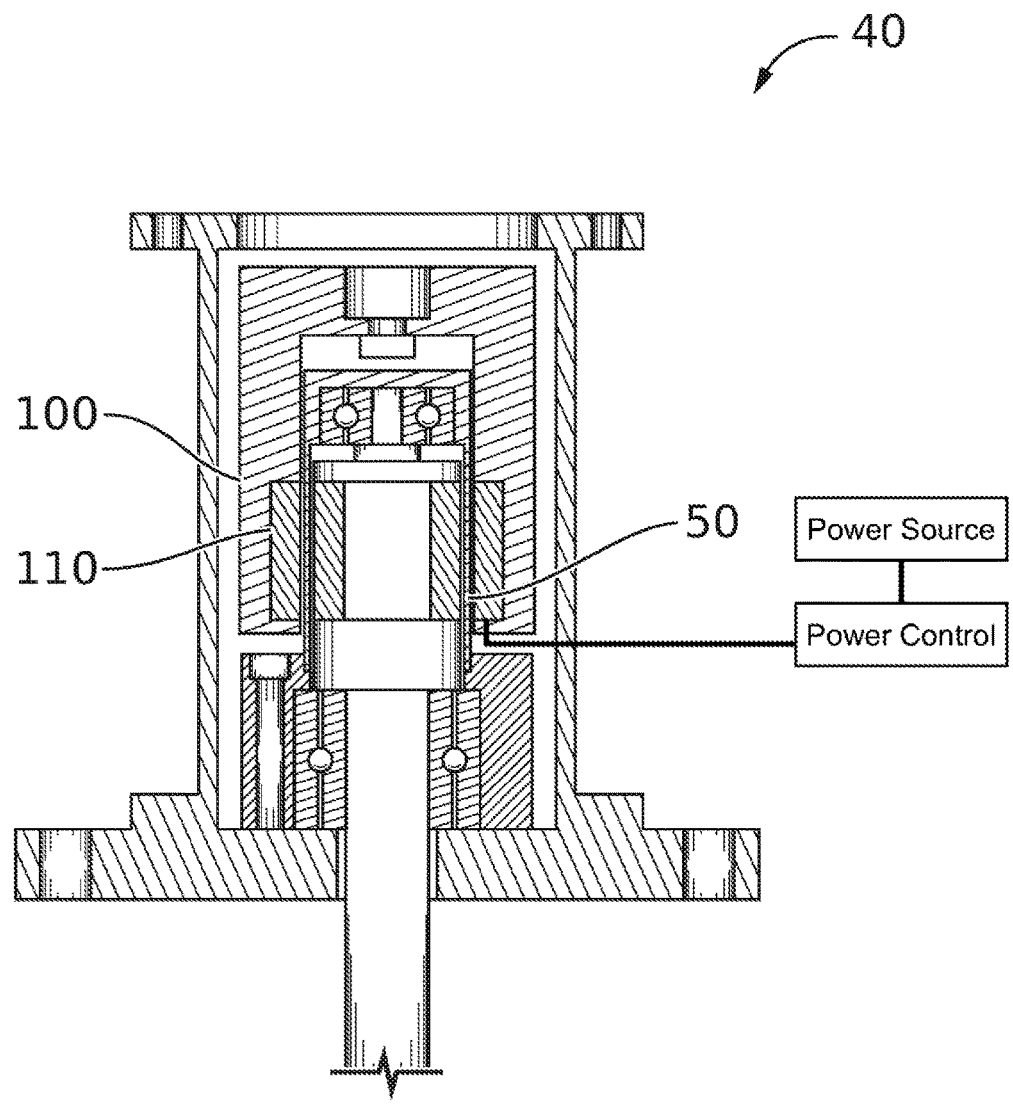
FIG. 9B is a partially schematic and partially side elevational view of an exemplary magnetic coupling drive of the surface-driven fluid recovery system shown in FIGS. 1 to 3, according to the present invention, wherein the magnetic coupling drive comprises an outer magnetic assembly and an inner magnetic assembly, the inner magnetic assembly comprises an electromagnet powered by a power source via a power control for variably regulate the amount of electrical current supplied to said electromagnet.

FIGS. 7A and 7B show a modification of the magnetic coupling 40 of the present invention, further being provided with a selectively-actuable direct coupling.

In the embodiment thereof shown in FIGS. 7A, 7B, the selectively-actuable direct coupling takes the form of a solenoid assembly 200, having a ferro-magnetic pin member 201 slidably moveable within windings 205 of solenoid assembly 200 for selectively directly coupling the outer magnetic assembly 100 with the inner magnetic assembly 110, when loss of electrical power occurs. Individual slip rings 203 are positioned on the exterior of outer magnetic assembly (which rotates), in order to allow supply of electrical current via slip rings 203 to solenoid windings 205. A compressible spring member (not shown) may be positioned within solenoid assembly 200 to force pin member 201 into engagement with inner magnetic assembly 110 to thereby couple outer magnetic assembly 100 with the inner magnetic assembly 110. FIG. 7A shows the outer magnetic assembly 100 directly coupled to the inner magnetic assembly 110. FIG. 7B shows the solenoid assembly 200 having caused pin member to be withdrawn from engagement with inner magnetic assembly 110, thereby having caused the outer magnetic assembly 100 to no longer be directly coupled to the inner magnetic assembly 110.

Surface Driven Rotational Power—Staged Gearbox Assembly

As described above, effective transmission of rotational power through the surface-driven fluid recovery system 10 is achieved by the rotational power transmission system comprising a speed-reducing transmission 30 integrated in the surface drive system 10, configured to reduce the rotational speed generated by the surface drive system 10, and a speed-increasing transmission 70 interconnecting the downhole end of the shaft assembly 50 to the pump 80 and configured when supplied by rotation energy from the shaft assembly 50 to increase the rotational speed of the pump 80.

Figure 5A:
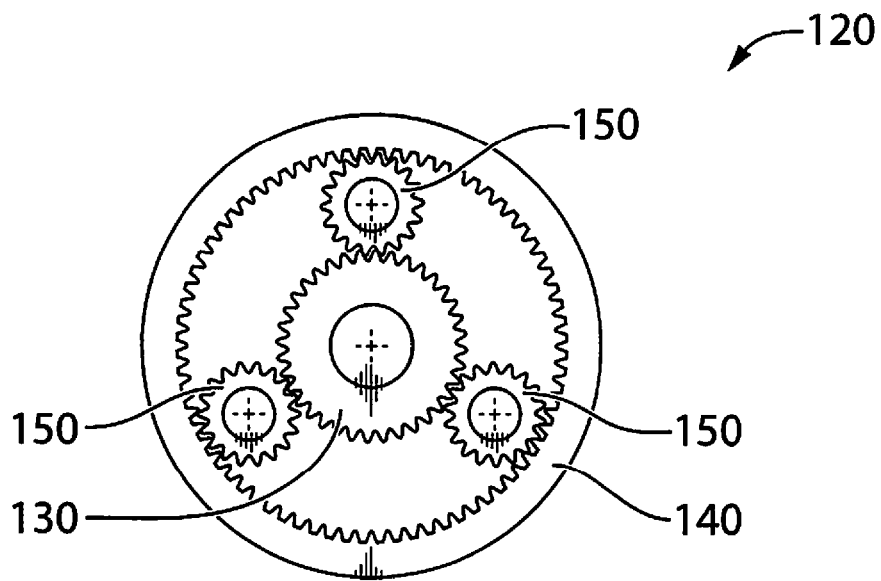
FIGS. 5A and 5B are schematic views of exemplary planetary gear assemblies of the surface-driven fluid recovery system shown in FIGS. 1 to 3, according to embodiments of the present invention, producing gear ratios of 2:1 (FIG. 5A) and 3:1 (FIG. 5B)
Figure 5B:
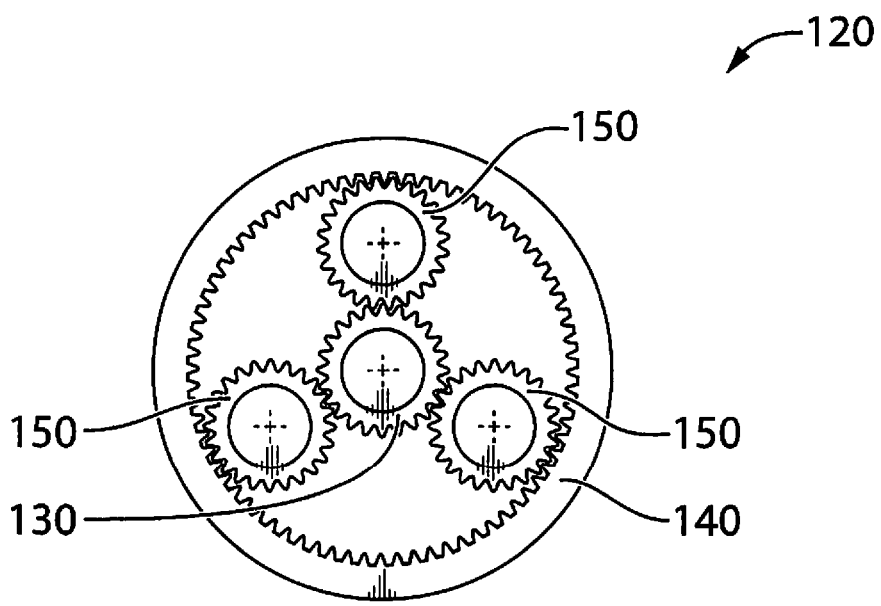

According to preferred embodiments, the speed-reducing transmission 30 and/or the speed-increasing transmission 70 are planetary gear assemblies as exemplified in FIGS. 5A and 5B. In such embodiments, one or more planet gears 150 rotate around a central sun gear 130. Typically, a planet carrier is driven by the input torque which rotates the planet gears 150 around a fixed outer ring 140. This in turn drives the sun gear 130 which then provides the output torque. By manipulating the configuration of the gears, according to known methods, gear ratios can be created that reduce or increase the rotational speed of the interconnected shaft assembly 50 to the desired level. According to embodiments, the planetary gear assembly is configured to have a reduction ratio ranging from about 1.5:1 to about 3:1. According to other embodiments, the planetary gear assembly is configured to have a reduction ratio of about 3:1. According to embodiments, the planetary gear assembly is configured to have a step-up ratio ranging from about 1:1.5 to about 1:3. According to other embodiments, the planetary gear assembly is configured to have a step-up ratio of about 1:3.

The compact design of a planetary gear assembly lends itself well to the small internal diameters found with typical well casings used in hydrocarbon recovery systems. According to embodiments, a planetary gear assembly of the present disclosure will have a length of up to about 3'. According to other embodiments, a planetary gear assembly of the present disclosure will have a length of up to about 2'. In this way, the transmissions 30, 70 can be made very compact yet provide the necessary substantial reduction and increase in rotational speed.

Moreover, as illustrated in FIGS. 6A, 6B, and 6C, the planetary gear assemblies can further be configured in multiple stages by coupling them to each other in series, whereby rotational speed can thereby be incrementally and sequentially stepped down or stepped up. In particular embodiments, for example, the speed-reducing transmission 30 and/or the speed-increasing transmission 70 can comprise multi-stage planetary gear assemblies 120 that can be combined to allow each stage of planetary gears to produce a larger or smaller cumulative gear ratio. According to embodiments, the multi-stage configuration 160 comprises up to ten stages of planetary gear assemblies 120. According to other embodiments, the multi-stage configuration 160 comprises up to eight stages of planetary gear assemblies 120. According to further embodiments, the multi-stage configuration 160 comprises up to six stages of planetary gear assemblies 120. According to other embodiments, the multi-stage configuration 160 comprises up to four stages of planetary gear assemblies 120. According to further embodiments, the multi-stage configuration 160 comprises up to two stages of planetary gear assemblies 120. As illustrated in FIGS. 6A, 6B, and 6C each stage of planetary gears 120 in the configuration will increase or reduce the gear ratio of the preceding stage to produce the cumulative gear ratio.

Use of examples in the specification, including examples of terms, is for illustrative purposes only and is not intended to limit the scope and meaning of the embodiments of the invention set out and described in the disclosure. In the specification, the word "comprising" is used as an open-ended term, substantially equivalent to the phrase "including, but not limited to," and the word "comprises" has a corresponding meaning.

The scope of the claims should not be limited by the preferred embodiments set forth in the foregoing examples, but should be given the broadest interpretation consistent with the description as a whole, and the claims are not to be limited to the preferred or exemplified embodiments of the invention.

The embodiments of the invention in which an exclusive property or privilege is claimed are defined as follows:

1. A surface-driven fluid recovery system for producing viscous fluids from a subsurface hydrocarbon deposit, comprising:
   a downhole pump situated downhole in a wellbore, and actuable by rotation;

an elongate shaft assembly extending from surface downwardly through in said wellbore, having a first uphole end and a second downhole end;

a speed-increasing transmission, interconnecting said second downhole end of the shaft assembly and said downhole pump, to increase rotational speed of said downhole pump;

a surface drive system, situated at said surface, for providing rotational energy to said first uphole end of said elongate shaft assembly, comprising:
  (a) a primary mover for generating rotational power;
  (b) a speed reducing transmission, for reducing rotational speed supplied by said primary mover directly or indirectly to said first uphole end of said shaft assembly; and
  (c) a magnetic drive coupling, having an outer magnetic assembly and an inner magnetic assembly, each of which is magnetized or magnetizable;

wherein:
(i) said magnetic drive coupling is situated intermediate said primary mover and said speed-reducing transmission, and:
  (a) said outer magnetic assembly is coupled to an input end of the speed-reducing transmission and said inner magnetic assembly is coupled to said primary mover; or
  (b) said outer magnetic assembly is coupled to said primary mover and said inner magnetic assembly is coupled to said input end of the speed-reducing transmission; or
(ii) said magnetic drive coupling is situated intermediate said speed reduction transmission and said first uphole end of said shaft assembly, and:
  (a) the outer magnetic assembly is coupled to an output end of the speed-reducing transmission and said inner magnetic assembly is coupled to said first uphole end of said shaft assembly; or
  (b) said outer magnetic assembly is coupled to said first uphole end of said shaft assembly and said inner magnetic assembly is coupled to said output end of said speed-reducing transmission.

2. The surface-driven fluid recovery system according to claim 1, wherein either the outer magnetic assembly or the inner magnetic assembly comprises an electromagnet, and wherein said electromagnet may be de-actuated or partially de-actuated when desired, and wherein said de-actuation or partial de-actuation thereof causes the inner and outer magnetic assemblies to cease or reduce transmission of rotational energy.

3. The surface-driven fluid recovery system according to claim 1, wherein said outer magnetic assembly comprises an electromagnet and said inner magnetic assembly comprises a material capable of being magnetized by said electromagnet when an electrical current is supplied to said electromagnet, wherein when said electrical current is supplied to said electromagnet said outer magnetic assembly reduces or prevents relative rotational movement between said outer magnetic assembly relative to said inner magnetic assembly.

4. The surface-driven fluid recovery system according to claim 3, further comprising power control means to variably regulate the amount of electrical current supplied to said electromagnet.

5. The surface-driven fluid recovery system according to claim 1, wherein said inner magnetic assembly comprises an electromagnet, and said outer magnetic assembly comprises a ferro-magnetic material capable of being magnetized by said electromagnet when an electrical current is supplied to said electromagnet, wherein when said electrical current is supplied to said electromagnet said inner magnetic assembly reduces or prevents relative rotational movement between said inner magnetic assembly relative to said outer magnetic assembly.

6. The surface-driven fluid recovery system according to claim 5, further comprising power control means to variably regulate the amount of electrical current supplied to said electromagnet.

7. The surface-driven fluid recovery system according to claim 1 wherein one of said outer magnetic assembly or said inner magnetic assembly comprises an electromagnet, said fluid recovery system further comprising:
  a selectively-actuable direct coupling means between said outer magnetic assembly and said inner magnetic assembly;
  wherein in the event of failure of supply of electrical current to said electromagnet and said primary mover, said direct coupling means directly couples said outer magnetic assembly to said inner magnetic assembly.

8. The surface-driven fluid recovery system according to claim 1, wherein said magnetic drive coupling is situated intermediate said speed reduction transmission and said first uphole end of said shaft assembly, and:
  (i) the outer magnetic assembly thereof is coupled to said output end of the speed reduction transmission and said inner magnetic assembly thereof is coupled to said first uphole end of said shaft assembly; or
  (ii) said outer magnetic assembly thereof is coupled to said first uphole end of said shaft assembly and said inner magnetic assembly is coupled to said output end of the speed reduction transmission.

9. The surface-driven fluid recovery system according to claim 1, wherein the speed reduction transmission comprises a planetary gear assembly.

10. The surface-driven fluid recovery system according to claim 9, wherein the planetary gear assembly is configured to have a reduction ratio of about 3:1.

11. The surface-driven fluid recovery system according to claim 9, wherein the planetary gear assembly comprises a plurality of planetary gear arrangements, each coupled together in series to effect a multiple stage reduction in rotational speed.

12. The surface-driven fluid recovery system according to claim 1, wherein the speed increasing transmission comprises a planetary gear assembly.

13. The surface-driven fluid recovery system according to claim 12, wherein the planetary gear assembly is configured to have a reduction ratio of about 3:1.

14. The surface-driven fluid recovery system according to claim 12, wherein the planetary gear assembly comprises a plurality of planetary gear arrangements, each coupled together in series to effect a multiple stage increase in rotational speed.

15. The surface-driven fluid recovery system according to claim 1, wherein the speed decreasing transmission comprises a planetary gear assembly.

16. The surface-driven fluid recovery system according to claim 15, wherein the planetary gear assembly comprises a plurality of planetary gear arrangements, each coupled together to effect a multiple stage decrease in rotational speed.

17. The surface-driven fluid recovery system according to claim 15, wherein the planetary gear assembly is configured to have a reduction ratio of about 3:1.

18. The surface-driven fluid recovery system according to claim 1, wherein the speed reduction transmission and the speed increasing transmission are substantially identical in configuration and provide equal respective reduction/increase in rotational speed.

19. The surface-driven fluid recovery system according to claim 1, wherein the primary mover comprises at least one motor for generating rotational power.

20. The surface-driven fluid recovery system according to claim 19, wherein the primary mover comprises two motors for generating rotational power.

21. The surface-driven fluid recovery system according to claim 19, wherein the primary mover comprises three motors for generating rotational power.

22. The surface-driven fluid recovery system according to claim 1, wherein the pump is a centrifugal pump.

23. The surface-driven fluid recovery system according to claim 1, wherein the pump is a progressive cavity pump.

24. A surface-driven fluid recovery system for producing viscous fluids from a subsurface hydrocarbon deposit, comprising:
- a surface drive system comprising a primary mover for generating rotational power;
- a pump submersed in said subsurface hydrocarbon deposit;
- an elongate shaft assembly to transmit rotational energy from said primary mover to said pump;
- a speed-reducing transmission forming part of the surface drive system, comprising a planetary gear assembly configured to reduce a rotational speed transmitted from the primary mover;
- a magnetic drive coupling, situated at surface, magnetically coupling said elongate shaft assembly to the surface drive system at a first end of said elongate shaft assembly, wherein the elongate shaft assembly transmits the rotational power from the surface drive system to the pump at a second end of the elongate shaft assembly, said magnetic drive coupling comprising:
  (i) an outer magnetic or magnetizable assembly coupled to the surface drive system, and
  (ii) an inner magnetic or magnetizable assembly mounted to the first end of the elongate shaft assembly, wherein the inner and outer magnetic or magnetizable assemblies together magnetically couple the elongate shaft assembly to the surface drive system, and wherein the outer magnetic or magnetizable assembly is coupled to the inner magnetic or magnetizable assembly by a de-actuable magnetic field which in turn allows transmission of the rotational energy to the pump;
- a speed-increasing transmission, located downhole and interconnecting the second end of the elongate shaft assembly to the pump, comprising a planetary gear assembly configured to increase the rotational speed transmitted from the elongate shaft assembly to the pump; and
- the pump interconnected to the second end of the elongate shaft assembly by the speed-increasing transmission;
- wherein deactivation of the magnetic field causes the inner and outer magnet assemblies to decouple to release transmission of rotational energy to the shaft.

25. A method for recovering a fluid from a subsurface hydrocarbon deposit, comprising:
providing the surface-driven fluid recovery system according to claim 24; and activating the inner and outer magnetic or magnetizable assemblies to magnetically couple the shaft assembly to the surface drive system to transmit the rotational power generated from the surface drive system to the shaft assembly; and
deactivating the magnetic field so as to cause the inner and outer magnet assemblies to decouple to release transmission of the rotational power to the shaft.

* * * * *